United States Patent [19]

Stuchbury

[11] Patent Number: 5,051,616
[45] Date of Patent: Sep. 24, 1991

[54] ZERO CROSSING DETECTOR ARRANGEMENTS

[75] Inventor: Ian K. Stuchbury, Cheam, England

[73] Assignee: U.S. Philips Corporation, New York, N.Y.

[21] Appl. No.: 528,659

[22] Filed: May 24, 1990

[30] Foreign Application Priority Data

May 31, 1989 [GB] United Kingdom ............... 8912459

[51] Int. Cl.$^5$ .......................................... H03K 5/153
[52] U.S. Cl. .................................. 307/354; 307/236; 328/114; 328/150
[58] Field of Search ............... 307/354, 352, 236, 517; 328/150, 114, 132; 375/82, 95; 364/723

[56] References Cited

U.S. PATENT DOCUMENTS 4,412,339 10/1983 Alfke et al. ........................ 375/95
4,587,448 5/1986 Batterman ......................... 307/517
4,870,659 9/1989 Oishi et al. ........................ 375/82

*Primary Examiner*—Stanley D. Miller
*Assistant Examiner*—Sinh N. Tran
*Attorney, Agent, or Firm*—William Squire

[57] ABSTRACT

A zero crossing detector arrangement which is operable on successive samples of an analogue signal comprises a first stage (3) which includes adders and dividers (A,D) for affording a first output (b4) corresponding to the average of two successive samples (x1,x2), a gate (G2) for affording a first estimate (B3) in dependence upon the relative signs of one of the successive samples (x1) and the first output and a second stage 4 which includes adders and dividers (A,D) for affording a second output (b6) corresponding to the average of the first output (b4) and a selected one of the successive samples (x1,x2) and a gate (G2) for affording a second estimate (B2) in dependence upon the relative signs of the second output (b6) and a selected one of either the one of the successive samples (x1,x2) or said first output (b4), the first estimate (B3) and the second estimate (B2) constituting an output word which is indicative of the position of a zero crossing.

24 Claims, 3 Drawing Sheets

ZERO CROSSING DETECTOR ARRANGEMENTS

This invention relates to zero crossing detector arrangements and is especially applicable to such arrangements for use in digital teletext decoders.

Teletext decoders are known for use, for example, in television receivers for receiving and decoding teletext data which is transmitted as part of the normal television signal, the teletext data being displayed as pages of text and/or graphics on the normal television screen. Up to the present time, teletext decoders have made use of both analogue and digital processing techniques and it is now proposed to provide a fully digital system which will complement the digital television receivers which are currently becoming available.

Within a digital teletext decoder, the teletext data, after it has been separated from the normal television picture information, is sampled at a frequency which is higher than the data rate frequency, and one of the functions that needs to be carried out is to determine from the sampled signals where zero crossings have occurred in the teletext data. In fact, what is required is the position of the peaks and troughs in the teletext data but this is most easily obtained from a knowledge of the zero crossings that have occurred in the teletext data.

It is an object of the present invention to provide a zero crossing detector arrangement which is especially suitable for use in a digital teletext decoder.

According to one aspect of the present invention there is provided a zero crossing detector arrangement which is operable on successive samples of an analogue signal, characterised by means for affording a first output corresponding to the average of two successive samples, means for affording a first estimate as to the location of a zero crossing in dependence upon the relative signs of one of said successive samples and said first output, means for affording a second output corresponding to the average of said first output and a selected one of said successive samples, and means for affording a second estimate as to the location of the zero crossing in dependence upon the relative signs of said second output and a selected one of either said one of said successive samples or said first output, said first and second estimates being used to substantially locate the position of the zero crossing.

Such an arrangement has the advantage, when produced in integrated circuit form, that it would occupy less chip area than previously proposed arrangements for detecting a zero crossing.

A preferred arrangement will be characterised by further means for comparing the signs of said two successive samples and for affording a zero crossing position output when said signs are different.

In carrying out the invention according to the aforesaid first aspect it may be arranged that the means for affording said first output and said second output each comprise an adder and means for halving the output of said adder, and that said selected one of said successive samples is selected in dependence upon said first estimate.

Conveniently, multiplexer means may be provided to which said successive samples are applied, for affording said selected one of said successive samples under the control of said first estimate.

In one arrangement it may be arranged that said multiplexer means comprises two multiplexers each operated under the control of said first estimate, one of said multiplexers having one of said successive samples and said first output applied to it and the other of said multiplexers having the other of said successive samples and said first output applied to it, the output of said multiplexers being applied to said means for affording said second output.

In an alternative arrangement it may be arranged that said multiplexer means comprises a first multiplexer operated under the control of said first estimate, said first multiplexer having said two successive samples applied to it, said means for affording said second output having the output of said first multiplexer and said first output applied to it, it being conveniently arranged that said means for affording said second output comprises a further multiplexer operable under the control of said first estimate, for selecting the sign of said first output or the sign of the output from said first multiplexer, said second output being afforded in dependence upon the output of said further multiplexer the sign of and said second output.

Advantageously, said successive samples will be in two's complement form, the most significant bit of which corresponds to the sign of the respective sample, in which case said means for affording said first and second estimates may each comprise an exclusive-OR gate.

According to a second aspect of the present invention there is provided a method of detecting a zero crossing occurring between successive samples of an analogue signal, characterised by the steps of generating a first output corresponding to the average of two successive samples, generating a first estimate as to the location of a zero crossing in dependence upon the relative sign of one of said successive samples and said first output, generating a second output corresponding to the average of said first output and a selected one of said successive samples, and generating a second estimate as to the location of the zero crossing in dependence upon the relative signs of said second output and a selected one of either said one of said successive samples of said first output, and substantially locating the position of the zero crossing from said first and second outputs.

An exemplary embodiment of the invention will now be described, reference being made to the accompanying drawings, in which.

Figure 1:
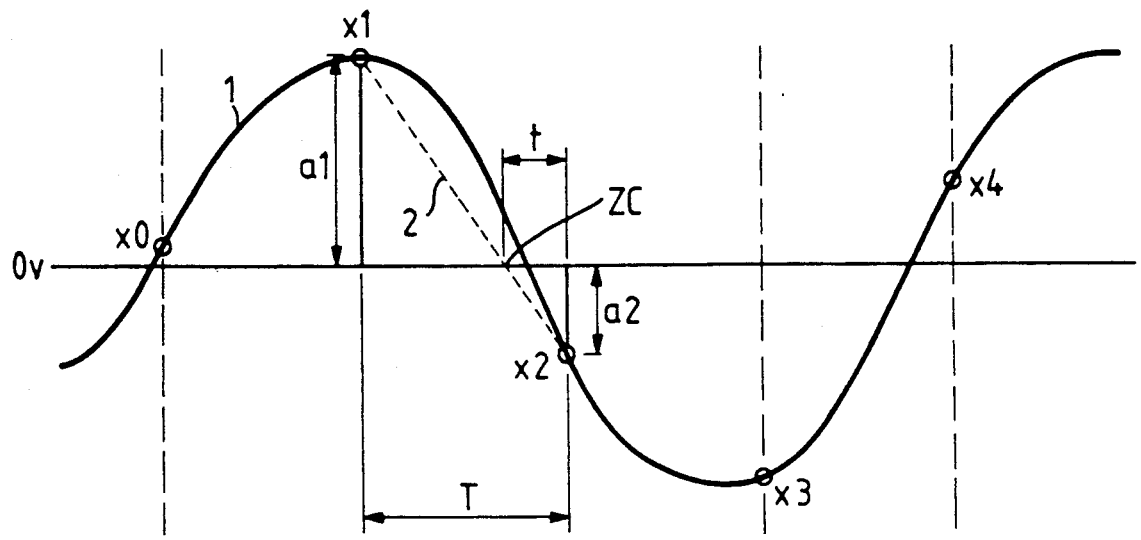
FIG. 1 depicts diagrammatically a sampled analogue signal in the form of a sine wave, which is useful in explaining the operation of the present invention.

In FIG. 1 of the drawings there is shown an analogue waveform 1, in the form of a sine wave, which could correspond to part of a teletext data signal received by a teletext decoder. It is assumed that the analogue waveform 1 is sampled at a rate which is approximately twice the data rate of the signal to afford successive samples x0, x1, x2, x3, x4, etc. A typical teletext data rate is 6.9375 MHz and a typical sampling rate may be 13.5 MHz, which is a sampling rate commonly used in digital television systems. Also, each sample may typically be defined by a 7-bit binary number in two's complement form, where the most significant bit (MSB) is indicative of the sign of the sample (i.e. positive or negative).

The function of the zero crossing detector arrangement to be described is to detect, from a knowledge of the successive samples x0 to x4, etc., where zero crossings have occurred in the analogue waveform 1.

In FIG. 1 it can be seen that a zero crossing ZC occurs between the samples x1 and x2 and an estimate of the position of the zero crossing may be obtained by considering a straight line 2 drawn between the samples x1 and x2.

If a1 is the sample value at x1, a2 is the sample value at x2, T is the sampling period and t is the time period of the estimated position of the zero crossing from the x2 sample time, then by similar triangles it can be shown that:

$$\frac{t}{T-t} = \frac{a2}{a1}$$

Therefore, $$t = \frac{a2T - a2t}{a1}$$

and $$t(a1 + a2) = a2T$$

as a fraction of the sampling period $$\frac{t}{T} = \frac{a2}{a1 + a2}$$

To evaluate t, a division of two 7-bit numbers every sample period is required, and although this can be done it requires a large amount of pipelining and considerable chip area if the zero crossing detector arrangement is to be constructed in integrated circuit form.

In the teletext application, it is only necessary to know the position of a zero crossing to an accuracy of 4-bits and it is possible to use a different approach based upon successive bisection of the straight line 2 drawn between the samples x1 and x2 in FIG. 1.

Figure 2:
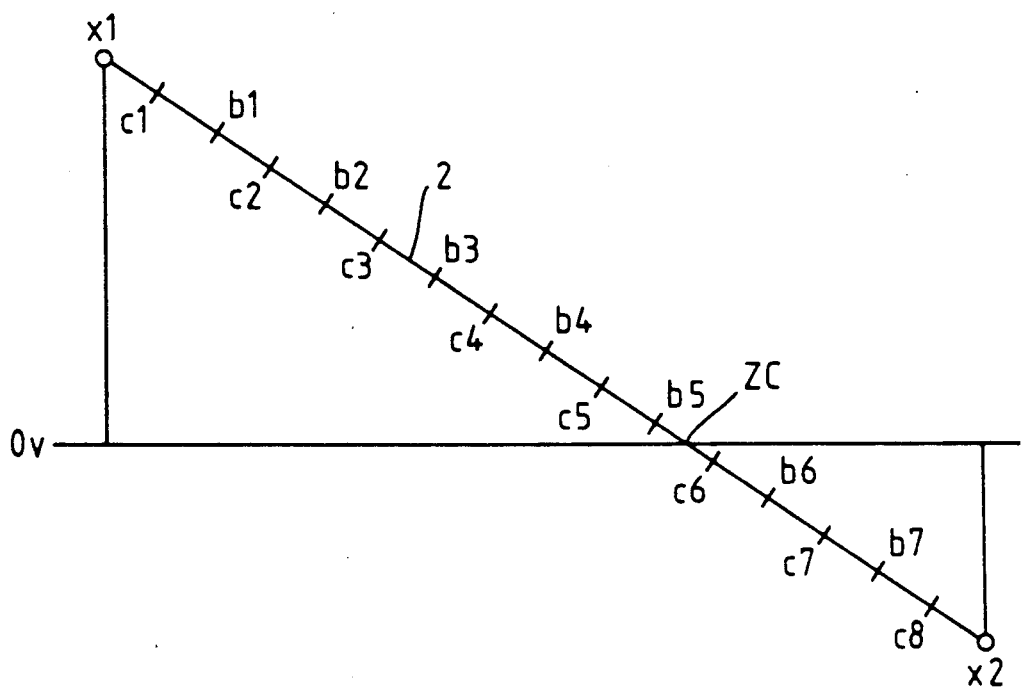
FIG. 2 depicts part of the diagram of FIG. 1 in greater detail.

In FIG. 2 of the drawings there is shown the line 2 of FIG. 1 on a larger scale.

The fact that a zero crossing has occurred can be determined by comparing the signs of the samples x1 and x2. If they are of opposite sign, i.e. one is positive and the other is negative then a zero crossing must have occurred. If they are both of the same sign e.g. both positive or both negative, then a zero crossing will not have occurred.

If a zero crossing has occurred as is depicted in FIGS. 1 and 2, then if the samples x1 and x2 are averaged the line 2 will be effectively bisected to afford the intermediate value b4.

If the value b4 is then compared with the samples x1 and x2, a comparison of their respective signs will indicate that a zero crossing occurred between b4 and x2 and if these two values are averaged the further intermediate value b6 is obtained.

The value b6 is then compared with b4 and x2. A comparison of their respective signs will indicate that a zero crossing occurred between b6 and b4 and if these two values are averaged a further intermediate value b5 is obtained.

The value of b5 is then compared with b6 and b4. A comparison of their respective signs will indicate that a zero crossing occurred between b5 and b6 and if these two values are simply combined, the sign of the combined total will indicate whether the zero crossing is between b5 and a further intermediate point c6 or between b6 and c6. If b5+b6 is negative, the zero crossing will have occurred between b5 and c6 as in FIG. 2, whereas if b5+b6 is positive, the zero crossing will have occurred between c6 and b6.

Thus the position of the zero crossing can be determined to the required accuracy.

Figure 3:
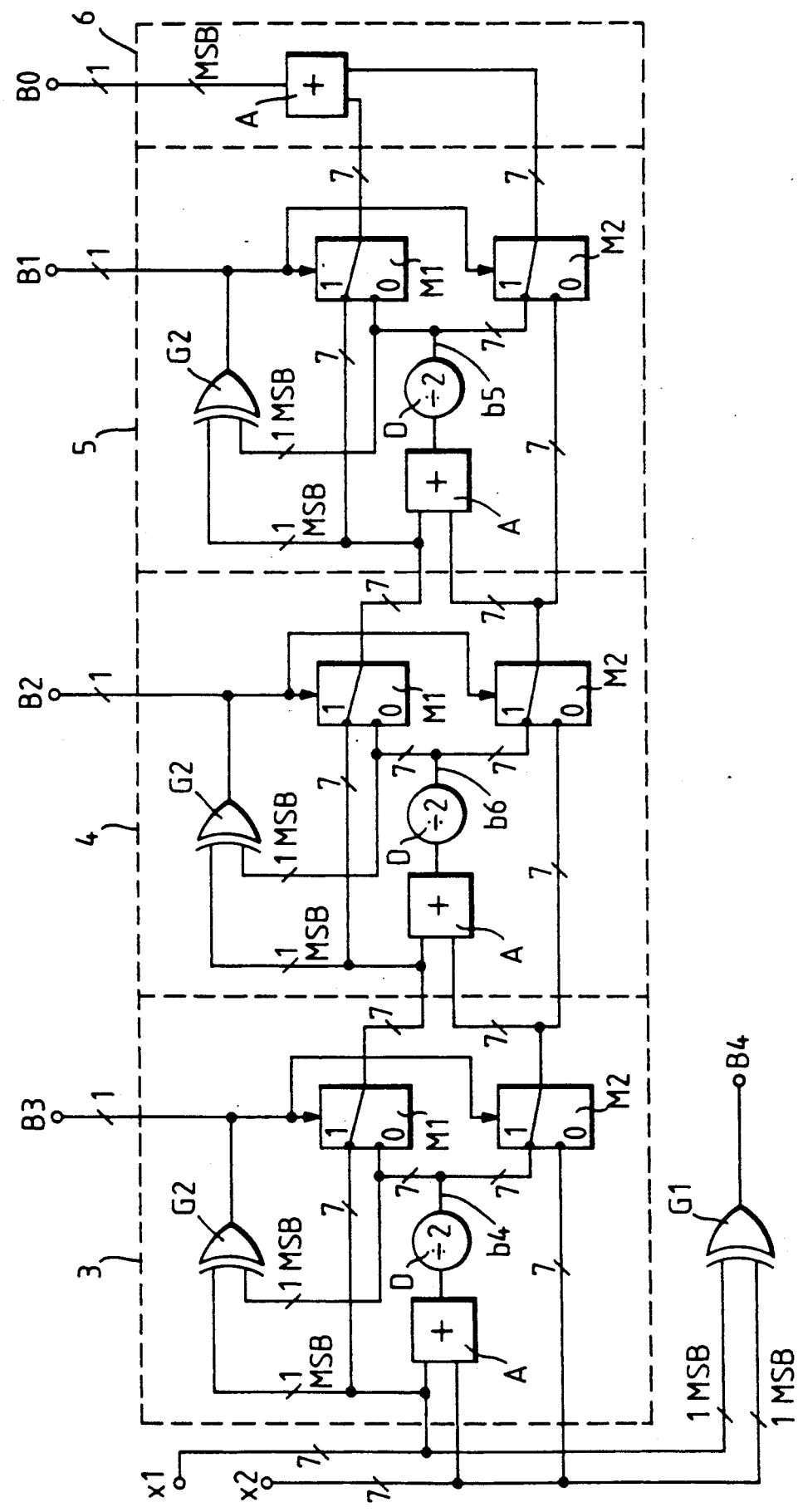
FIG. 3 is a block schematic diagram of a zero crossing detector arrangement in accordance with the present invention.

In FIG. 3 of the drawings there is shown the block schematic diagram of a zero crossing detector arrangement which operates in accordance with the above described successive bisection technique.

The arrangement shown in FIG. 3 consists basically of three successively connected identical stages shown within dashed boxes 3, 4 and 5 followed by a simplified final stage 6.

The samples x1 and x2 already referred to in connection with FIGS. 1 and 2, and which, as has already been mentioned, may each take the form of a 7-bit number in two's complement form, are applied as inputs to the first stage 3. The most significant bit (MSB) of each of the samples x1 and x2, which are indicative of their respective signs (i.e. positive or negative) are also applied to an exclusive-OR gate G1 which affords an output B4 which will typically be at logic level "1" if the signs are different, i.e. a zero crossing has occurred, or at a logic level "0" if the signs are the same i.e. no zero crossing has occurred.

Within the stage 3, the samples x1 and xZ are applied to the inputs of an adder A in which they are combined. The combined outputs are then applied to a divide-by-two circuit D, which is conveniently implemented by carrying out a right-shift of the combined output from the adder A, which affords an output b4 which is the average of the samples x1 and x2 and which corresponds to the intermediate value b4 already referred to in connection with FIG. 2. The sign (MSB) bit of the sample x1 and the sign (MSB) bit of the intermediate value b4 are also applied to an exclusive-OR gate G2 which affords an output B3 in dependence upon the relative signs thereof, the output B3 being at logic level "1" if the signs are different or logic level "0" if the signs are the same.

As well as affording the output B3, the output from the exclusive OR gate G2 is used to select which of the samples x1 and x2 is used with the output b4 in the next stage 4 of the arrangement. This is achieved by making use of two 7-bit dual multiplexers M1 and MZ, to multiplexer M1 of which is applied the sample x1 and the intermediate output b4 and to multiplexer M2 of which is applied the intermediate output b4 and the sample x2. The multiplexers M1 and M2 are arranged so that if output B3 is at logic level "1" multiplexer M1 passes sample x1 on to the next stage 4 and multiplexer M2 passes intermediate output b4 on to the next stage 4, whereas if output B3 is at logic level "0", multiplexer M1 passes intermediate output b4 on to stage 4 and multiplexer M2 passes on sample x2 to the next stage 4.

Thus, the outputs from the multiplexers M1 and M2 of stage 3 are applied as inputs to the next stage 4 which operates in the same way as stage 3 and which affords an output B2 from its exclusive-OR gate G2 and also two further outputs from the multiplexers M1 and M2 thereof.

These outputs are applied as inputs to the input of stage 5 which operates in the same way as stages 3 and 4 and which affords an output B1 from its exclusive-OR gate G2 and also two further outputs from its multiplexers M1 and M2 to the final stage 6 of the arrangement.

The final stage 6 of the arrangement consists of a 7-bit adder A which combines the inputs applied to it and which outputs the sign (MSB) bit of the combined output as a further output B0. It will be readily appreciated that the zero crossing detector arrangement which has been described with reference to FIG. 3 closely matches the description of operation that was given in relation to FIG. 2 of the drawings and it can easily be shown that the outputs B3, B2, B1 and B0 from the stages 3, 4, 5 and 6 respectively of the arrangement of FIG. 3 form an output word which is indicative of the position on the line 2 of FIG. 2 that the zero crossing occurs. The following table sets out the various values of the output word for each of the different portions of the line 2 referred to in FIG. 2.

| ZERO CROSS | OUTPUT WORD | | | |
|---|---|---|---|---|
| POSITION | B3 | B2 | B1 | B0 |
| x1 - c1 | 1 | 1 | 1 | 1 |
| c1 - b1 | 1 | 1 | 1 | 0 |
| b1 - c2 | 1 | 1 | 0 | 1 |
| c2 - b2 | 1 | 1 | 0 | 0 |
| b2 - c2 | 1 | 0 | 1 | 1 |
| c2 - b3 | 1 | 0 | 1 | 0 |
| b3 - c4 | 1 | 0 | 0 | 1 |
| c4 - b4 | 1 | 0 | 0 | 0 |
| b4 - c5 | 0 | 1 | 1 | 1 |
| c5 - b5 | 0 | 1 | 1 | 0 |
| b5 - c6 | 0 | 1 | 0 | 1 |
| c6 - b6 | 0 | 1 | 0 | 0 |
| b6 - c7 | 0 | 0 | 1 | 1 |
| c7 - b7 | 0 | 0 | 1 | 0 |
| b7 - c8 | 0 | 0 | 0 | 1 |
| c8 - x2 | 0 | 0 | 0 | 0 |

It will be appreciated that the arrangement of FIG. 3 has been described making use of the samples x1 and xZ referred to in FIG. 2 of the drawings, between which samples a zero crossing ZC occurs. It should be appreciated that in normal use the arrangement of FIG. 3 will operate on each successive pair of sampled signals, such as the signals x0,x1; x1,x2; x2,x3; x3,x4; depicted in FIG. 1 of the accompanying drawings and that a zero crossing will not always occur between each successive pair of samples. To ensure that a valid output word B3,B2,B1,B0 is afforded only when a zero crossing has occurred, the output B4 which is indicative of the existence of a zero crossing having occurred is used to gate the output word and to block any invalid output words.

It should also be appreciated that although the arrangement of FIG. 3 has been described in relation to 7-bit samples and a 4-bit output word, it may be modified to accept other than 7-bit samples and more or fewer of the stages 3, 4 and 5 could be used dependent upon the required accuracy of the zero crossing position.

Whilst the zero crossing detector arrangement which has been described with reference to FIG. 3 operates satisfactorily and can reasonably easily be constructed in integrated circuit form, it makes use of two 7-bit dual multiplexers M1 and M2 for each of the stages 3, 4 and 5 thereof and these are relatively complex devices which take up a large amount of chip area.

Figure 4:
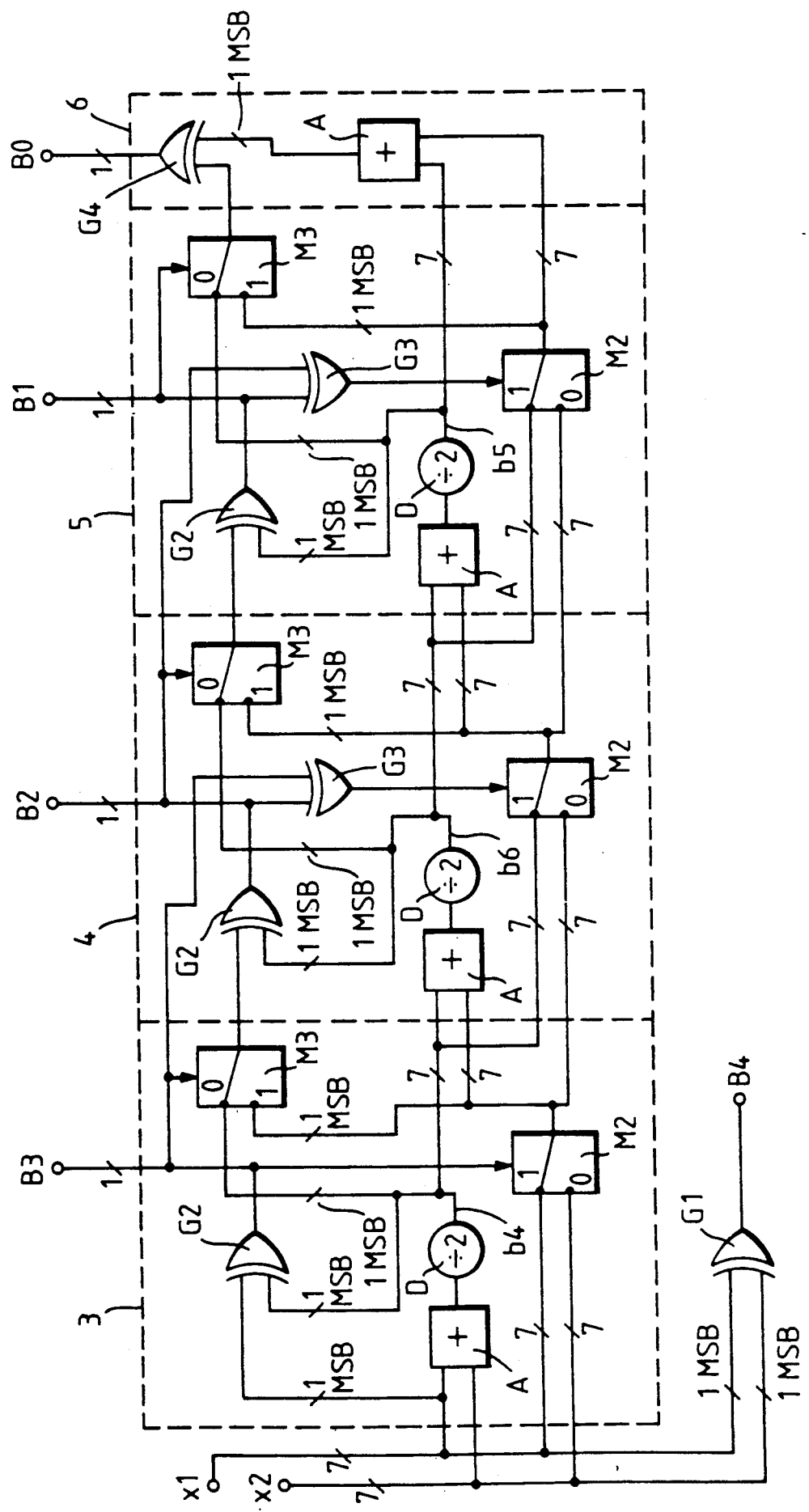
FIG. 4 is a block schematic diagram of an improved form of the zero crossing detector arrangement shown in FIG. 3.

It will be further appreciated in the zero crossing detector arrangement described with reference to FIG. 3 of the drawings that the output from the divide-by-two circuit D of each of the stages 3, 4 and 5 is always passed on by one or other of the multiplexers M1 and M2 thereof. In FIG. 4 of the accompanying drawings there is shown a modification of the arrangement of FIG. 3 which enables the 7-bit dual multiplexer M1 of each stage of FIG. 3 to be dispensed with and replaced by a single-bit dual multiplexer and some associated single-bit gates.

In the zero crossing detector arrangement shown in FIG. 4, the parts thereof that correspond to those already described with reference to FIG. 3 have been given the same references. In the arrangement of FIG. 4 the output from the divide-by-two circuit D of each stage is connected directly as an input to the adder A of the following stage. The multiplexer M2 of each of the stages 3, 4 and 5 is used to select between the inputs applied to its respective adder A under the control of a signal applied to it. In the case of stage 3, the output B3 from the gate G2 is used to control the multiplexer M2. In the case of stage 4, the control signal is derived via a single bit dual multiplexer M3 of stage 3 which selects between the sign (MSB) bits of the signals applied to the adder A of stage 4 under the control of the B3 output, the output of the multiplexer M3 of stage 3 being applied as one input to exclusive-OR gate G2 of stage 4, to the other input of which is applied the sign (MSB) bit from the output of the divide-by-two circuit D of stage 4. The output from exclusive-OR gate GZ of stage 4 affords the output B2 and is applied along with the B3 output to a further exclusive-OR gate G3 the output of which is used to control the multiplexer MZ of stage 4.

Stage 5 is connected similarly to stage 4.

In stage 6, the sign (MSB) bit of output of the adder A is applied, along with the output of multiplexer M3 of stage 5 to an exclusive-OR gate G2 the output of which affords the output B0.

The operation of FIG. 4, using the example of FIG. 2 as a basis is as follows:

The adder A and divide-by-two circuit D of stage 3 average the samples x1 and x2 to afford an output b4. The sign (MSB) bit of x1 (logic level "0") and the sign (MSB) bit of b4 (logic level "0") are applied to exclusive-OR gate G2 which affords output B3 (logic level "0"). Output B3 is also applied to multiplexer M2 of stage 3 which consequently selects sample x2 to be fed to adder A of stage 4. Adder A of stage 4 also has the output b4 applied to it and the average value of x2 and b4 which corresponds to b6 is afforded by divide-by-two circuit D of stage 4.

The sign (MSB) bit of each of b4 (logic level "0") and the output of multiplexer M2 (here x2) (logic level "1") are applied to the multiplexer M3 of stage 3 which is controlled by output B3 (logic level "0"), and which therefore selects the sign (MSB) bit of b4 (logic level "0"). The output of multiplexer M3 (logic level "0") of stage 3 is applied to exclusive-OR gate GZ of stage 4 along with the sign (MSB) bit of b6 (logic level "1") which affords the output B2 (logic level "1"). The outputs B3 (logic level "0") and B2 (logic level "1") are applied to exclusive-OR gate G3 of stage 4 which applies a logic level "1" to multiplexer MZ of stage 4 to select output b4 to be fed to adder A of stage 5. Adder A of stage 5 also has the output b6 applied to it and the average value of b4 and b6 which corresponds to b5 is afforded by divide-by-two circuit D of stage 5.

The sign (MSB) bit of each of b6 (logic level "1") and b4 (logic level "0") are applied to the multiplexer M3 of stage 4 which is controlled by output B2 (logic level "1"), and which therefore selects the sign (MSB) bit of b4 (logic level "0"). The output of multiplexer M3 (logic level "0") of stage 4 is applied to exclusive-OR gate G2 of stage 5 along with the sign (MSB) bit of b5 logic level "0") which affords the output B1 (logic level "0"). The outputs B2 (logic level "1") and B1 (logic level "0") are applied to exclusive-OR gate G3 of stage 5 which applies a logic level "1" to the multiplexer M2 of stage 5 to select output b6 to be applied to adder A of stage 6. Adder A of stage 6 also has output b5 applied to it and b6 and b5 are combined in adder A of stage 6 and the sign (MSB) bit of the combined total (logic level "1") is applied as one input to an exclusive-OR gate G4 of stage 6.

The sign (MSB) bit of each of b5 (logic level "0") and b6 (logic level "1") are applied to multiplexer M3 of stage 5 which is controlled by output B1 (logic level "0") and selects the sign (MSB) bit of b5 (logic level "0") to be applied to exclusive-OR gate G4 of stage 6. The exclusive-OR gate G4 of stage 6 affords the B0 output (logic level "1").

The output word afforded by the outputs B3,B2,B1 and B0 is therefore 0 1 0 1 which according to the table set out hereinbefore corresponds to the zero crossing occurring between the points b5 and b6 on the line 2 of FIG. 2.

Although the zero crossing detector arrangements which have been described have been designed for use in digital teletext decoders, it will be appreciated that they may be used in any suitable application where zero crossings are to be detected from sampled signals.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof which would be apparent to persons skilled in the art, whether or not it relates to the same invention as presently claimed in any claim and whether or not it mitigates any or all of the same technical problems as does the present invention. The applicants hereby reserve the right to formulate new claims to such features and/or combinations of such features during the prosecution of the present application or of any further application derived therefrom.

What is claimed is:

1. A zero crossing detector arrangement which is operable on digitized successive samples of an analogue signal, characterised by means for affording a first output corresponding to the average of two digitized successive samples, means for affording a first estimate as to the location of a zero crossing in dependence upon the relative signs of one of said digitized successive samples and said first output, means for affording a second output corresponding to the average of said first output and a selected one of said digitized successive samples, and means for affording a second estimate as to the location of the zero crossing in dependence upon the relative signs of said second output and a selected one of either said one of said digitized successive samples or said first output, said first and second estimates being used to substantially locate the position of said zero crossing.

2. An arrangement as claimed in claim 1, characterised by further means for comparing the signs of said two digitized successive samples and for affording a zero crossing position output when said signs are different.

3. An arrangement as claimed in claim 1, characterised in that the means for affording said first output and said second output each comprise an adder and means for halving the output of said adder.

4. An arrangement as claimed in claim 1, characterised in that said selected one of said digitized successive samples is selected in dependence upon said first estimate.

5. An arrangement as claimed in claim 4, characterised by multiplexer means to which said, digitized successive samples are applied and for affording said selected one of said digitized successive samples under the control of said first estimate.

6. An arrangement as claimed in claim 5, characterised in that said multiplexer means comprises two multiplexers each operated under the control of said first estimate, one of said multiplexers having one of said digitized successive samples and said first output applied to it and the other of said multiplexers having the other of said digitized successive samples and said first output applied to it, the outputs of said multiplexers being applied to said means for affording said second output.

7. An arrangement as claimed in claim 5, characterised in that said multiplexer means comprises a first multiplexer operated under the control of said first estimate, said first multiplexer having said two digitized successive samples applied to it, said means for affording said second output having the output of said first multiplexer and said first output applied to it.

8. An arrangement as claimed in claim 7, characterised in that said means for affording said second output comprises a further multiplexer operable under the control of said first estimate for selecting the sign of said first output or the sign of the output from said first multiplexer, said second estimate being afforded in dependence upon the output of said further multiplexer and the sign of said second output.

9. An arrangement as claimed in claim 1, in which said digitized successive samples are in two's complement form, the most significant bit of which corresponds to the sign of the respective sample.

10. An arrangement as claimed in claim 9, in which said means for affording said first and second estimates each comprise an exclusive OR gate.

11. A method of detecting a zero crossing occurring between digitized successive samples of an analogue signal, characterised by the steps of generating a first output corresponding to the average of two digitized successive samples, generating a first estimate as to the location of a zero crossing in dependence upon the relative sign of one of said digitized successive samples and said first output, generating a second output corresponding to the average of said first output and a selected one of said digitized successive samples, and generating a second estimate as to the location of the zero crossing in dependence upon the relative signs of said second output and a selected one of either said one of said digitized successive samples of said first output, and substantially locating the position of said zero crossing from said first and second outputs.

12. A method as claimed in claim 11, in which the signs of said two digitized successive samples are compared and a zero crossing location output is afforded when said signs are different.

13. An arrangement as claimed in claim 2, characterized in that the means for affording said first output and said second output each comprise an adder and means for halving the output of said adder.

14. An arrangement as claimed in claim 2, characterized in that said selected one of said successive samples is selected in dependence upon said first estimate.

15. An arrangement as claimed in claim 3, characterized in that said selected one of said successive samples is selected in dependence upon said first estimate.

16. An arrangement as claimed in claim 2, in which said successive samples are in two's complement form the most significant bit of which corresponds to the sign of the respective sample.

17. An arrangement as claimed in claim 3, in which said successive samples are in two's complement form the most significant bit of which corresponds to the sign of the respective sample.

18. An arrangement as claimed in claim 4, in which said successive samples are in two's complement form the most significant bit of which corresponds to the sign of the respective sample.

19. An arrangement as claimed in claim 5, in which said successive samples are in two's complement form the most significant bit of which corresponds to the sign of the respective sample.

20. An arrangement as claimed in claim 6, in which said successive samples are in two's complement form the most significant bit of which corresponds to the sign of the respective sample.

21. An arrangement as claimed in claim 7, in which said successive samples are in two's complement form the most significant bit of which corresponds to the sign of the respective sample.

22. An arrangement as claimed in claim 8, in which said successive samples are in two's complement form the most significant bit of which corresponds to the sign of the respective sample.

23. An arrangement as claimed in claim 13, characterized by multiplexer means to which said successive samples are applied and for affording said selected one of said successive samples under the control of said first estimate.

24. An arrangement as claimed in claim 14, characterized by multiplexer means to which said successive samples are applied and for affording said selected one of said successive samples under the control of said first estimate.

* * * * *